Jan. 27, 1959   R. M. SASSE   2,870,502
DRIVING GLOVE HOLDER
Filed Oct. 21, 1955

INVENTOR.
RAYMOND M SASSE,
BY
McMorrow, Berman + Davidson
ATTORNEYS.

2,870,502
DRIVING GLOVE HOLDER

Raymond M. Sasse, Portland, Oreg.

Application October 21, 1955, Serial No. 541,986

1 Claim. (Cl. 24—17)

This invention relates to means applicable to the steering column of a vehicle, for the purpose of permitting driving gloves to be supported adjacent the steering column, where they can be conveniently kept, ready for use whenever desired.

Heretofore, the general practice has been to keep one's driving gloves in a coat pocket, on the seat beside him, or in the glove compartment of the vehicle. In each of these circumstances, the driving gloves are not kept in a fully convenient location. For example, when kept in the glove compartment, they may not be removed with maximum convenience so far as the vehicle operator is concerned, due to the fact that the glove compartment may be spaced to one side of the steering column a substantial distance, and may not be capable of being opened with complete speed and ease. Further, within the glove compartment the gloves can become intermixed with many other articles kept therein.

The main object of the present invention, accordingly, is to provide a holder for driving gloves, capable of being swiftly attached to the steering column, with the gloves being securely held in position against the steering column but being removable from the holder with a minimum of difficulty whenever they are to be worn.

Another object is to provide a holder as stated which will be very inexpensively formed, from a pair of flexible, straplike members, which members are equipped with separable fastener elements at predetermined locations along the length thereof, with said fastener elements being faced in a predetermined direction and some of the elements being of the male type and others being of the female type, the final arrangement being such as to permit the holders first to be secured to the steering column, and then to provide normally closed loops holding the driving gloves.

Another object is to provide a holder as stated which will be so designed as to support the gloves inconspicuously against the steering column, so that they will not detract from the appearance of the vehicle interior.

Still another object is to provide a holder as described which will be adjustable not only so far as the steering column-embracing portion thereof is concerned, but also with regard to the loop portions in which the gloves are retained, the lateral adjustment being adapted to permit large, small, or thick gloves all to be secured against the steering column with equal tightness.

Other objects will appear from the following description, the claim appended thereto, and from the annexed drawing, in which like reference characters designate like parts throughout the several views, and wherein:

Figure 1:
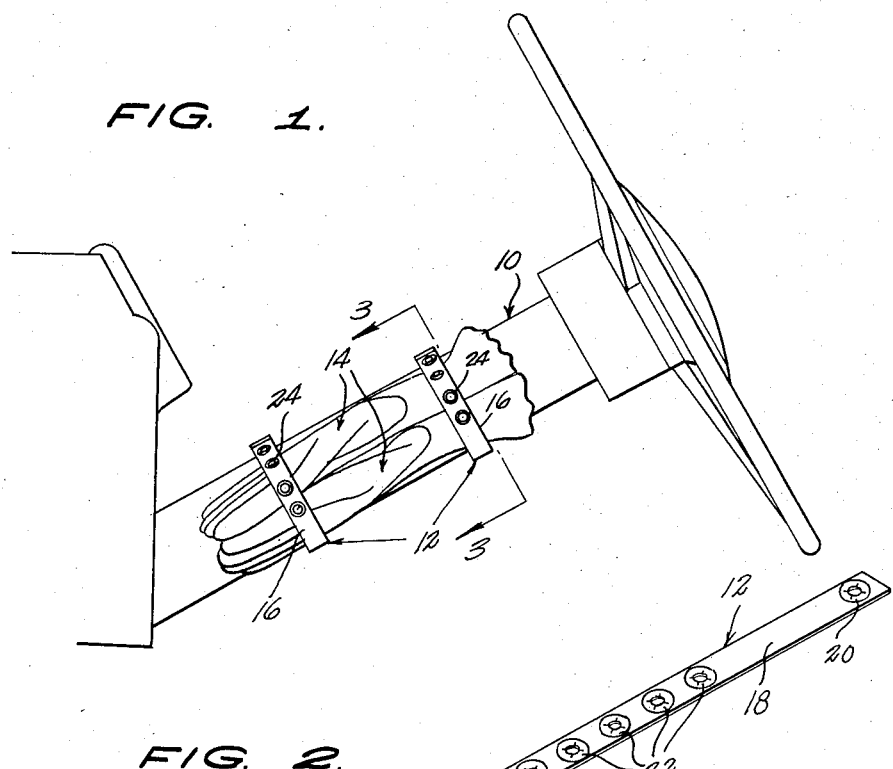
Figure 1 is a side elevational view of a steering column equipped with a holder formed according to the present invention, a pair of gloves being engaged by said holder.

Referring to the drawings in detail, a steering column has been generally designated by the reference numeral 10. At 12 there has been similarly designated a glove holder formed according to the present invention, while at 14 there has been generally designated a pair of gloves.

Figure 2:
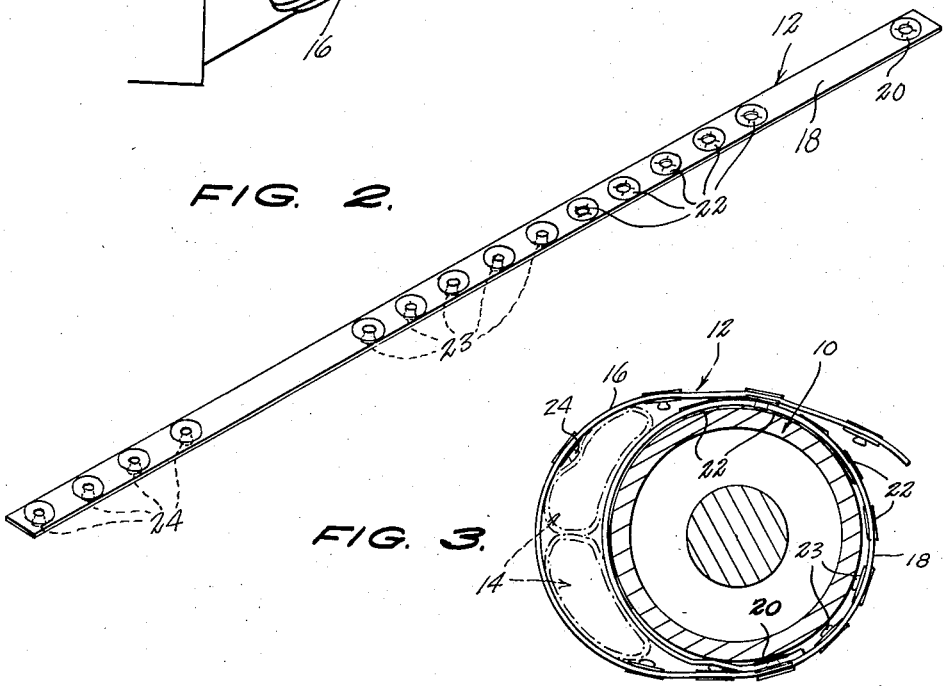
Figure 2 is a perspective view of one of the holder members per se, removed from the steering column.
Figure 3:
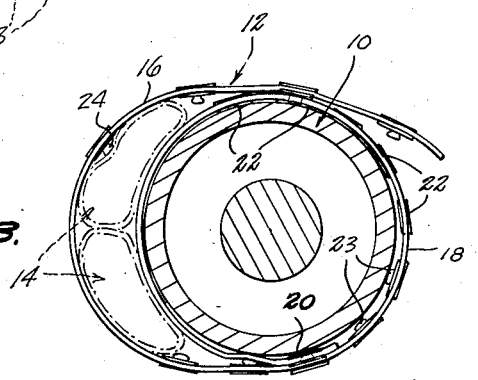
Figure 3 is an enlarged transverse sectional view through the steering column on line 3—3 of Figure 1.

The holder 12 comprises a pair of identical, spaced holder members each of which is formed in the manner shown in Figure 2. Each holder member includes an elongated, wide body of flexible material, such as plastic, leather, etc.

One end portion 16 of the body constitutes a glove-engaging portion, while the other end portion 18 constitutes a steering-column-embracing portion of the body. At the free end of the portion 18 there is provided a single separable fastener element 20 of the gripper type, this being a female element. Spaced from the element 20 is a second series of gripper fastener elements 22, also of the female type, these being uniformly spaced apart along the length of the flexible body. Then, there is provided a third longitudinal series of male gripper fastener elements 23, the heads of the elements 23 all facing in one direction from the flexible body. As will be noted, that element 23 nearest the row of elements 22 is spaced from the nearest element 22 a distance equal to that between said element 23 of the next adjacent element 23. In other words, this series of elements 22 merges into the series of elements 23 without a break so as to provide a longitudinal row of gripper fastener elements intermediate opposite ends of the flexible body, half of the elements of said row being female and the other half being male, all the elements of the row being uniformly spaced apart along the length of the body.

At the other extremity of the body, that is, on the portion 16, there is provided a first series of gripper fastener elements 24 of the male type, the heads of which project from the body in the same direction as the heads of the elements 23. Elements 24 are uniformly spaced apart along the length of the flexible body, with the series of elements 24 being spaced a substantial distance longitudinally of the body from the series of elements 23.

In use of the holder, a pair of the holder members is used, the members of said pair being spaced apart longitudinally of the steering column 10. As a first step, the end portion 18 is wrapped about the steering column, with the element 20 being engaged by a selected one of the elements 23. The selection of the element 23 will depend, of course, on the diameter of the particular steering column, so that it is seen that the circular, steering-column-embracing loop defined by wrapping of the portion 18 upon the steering column is adjustable in diameter.

The portion 16 constitutes an extension of the steering-column-embracing loop, and one need only position the gloves against the steering column, after which the free end of the portion 16 is pulled to hold the gloves securely against the steering column. Then, a selected male gripper fastener element 24 is engaged with a selected one of the female gripper fastener elements 22. Thus, the glove-receiving loop defined by the portion 16, like the steering-column-embracing loop, not only is capable of being opened, but also is capable of being adjusted as to its transverse area.

Whenever the gloves are to be removed, it is merely necessary to open the glove receiving loops, with said loops being left open if desired until such time as the gloves are to be returned to place.

It will be seen that the construction provides a decidedly inexpensive holder for driving gloves, which holder is applicable to steering columns of different diameters, and which is further adapted to receive gloves of different sizes, thicknesses, and lengths.

Further, the holder is so designed as to be capable of manufacture at a very low cost, since it requires nothing more than a pair of flexible strap members to which a plurality of gripper fastener elements is secured.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claim.

What is claimed is:

A driving glove holder for mounting on a steering column of a vehicle, comprising: a looped element having a circular shape for receiving a steering column; flexible means extending wholly exteriorly of said element; and means separably connecting said flexible means to said element at selected locations angularly spaced about the element, said connecting means being adapted for forming the flexible means to a selected, adjusted length and being also adapted for forming said element to an adjusted size while separably closing the same about the steering column, said connecting means comprising a first longitudinal series of gripper fastener elements at one end of the flexible means, a second series of gripper fastener elements, the elements of said second series being spaced apart circumferentially of the looped element and mating with the elements of the first series, said first and second series being overlapped with a selected gripper fastener element of the first series being connected to a selected element of the second series, a single gripper fastener element on the looped element spaced circumferentially of the looped element from the second series, and a third series of gripper fastener elements on the other end of the flexible means, said single element mating with and being connected separably to any selected one of the elements of the third series, said one end of the flexible means when detached from the looped element being adapted to be swung away from the looped element to permit insertion of a pair of driving gloves between the flexible means and the looped element, said holder comprising a single length of flexible material, said single gripper fastener element being at one extremity of said length, the first series of elements being at the other extremity of said length, the second and third series being disposed intermediate the opposite ends of said length, the second series extending longitudinally of said length intermediate said single gripper fastener element and the third series, with the third series extending longitudinally of said length at a location intermediate the first series and the second series, the connection of said single gripper fastener element to the selected, mating element of the third series forming said looped element, said length extending in a continuous spiral from one to its opposite extremities to define the looped element at the center of the spiral.

References Cited in the file of this patent
UNITED STATES PATENTS

| | | |
|---|---|---|
| 441,693 | McElroy | Dec. 2, 1890 |
| 654,668 | Pergande | July 31, 1900 |
| 800,050 | Ayres | Sept. 19, 1905 |
| 2,445,349 | Garbutt | July 20, 1948 |

FOREIGN PATENTS

| | | |
|---|---|---|
| 22,248 | Great Britain | 1897 |